United States Patent
Stockdale et al.

(10) Patent No.: US 10,035,896 B2
(45) Date of Patent: *Jul. 31, 2018

(54) SALTS OF PYROPHOSPHONIC ACID AS FLAME RETARDANTS

(71) Applicant: Chemtura Corporation, Middlebury, CT (US)

(72) Inventors: Zachary D. Stockdale, West Lafayette, IN (US); Matthew S. Burge, West Lafayette, IN (US)

(73) Assignee: LANXESS SOLUTIONS US INC., Middlebury, CT (US)

( * ) Notice: Subject to any disclaimer, the term of this patent is extended or adjusted under 35 U.S.C. 154(b) by 170 days.

This patent is subject to a terminal disclaimer.

(21) Appl. No.: 14/690,992

(22) Filed: Apr. 20, 2015

(65) Prior Publication Data

US 2016/0032076 A1 Feb. 4, 2016

Related U.S. Application Data

(60) Provisional application No. 62/115,000, filed on Feb. 11, 2015, provisional application No. 62/030,125, filed on Jul. 29, 2014.

(51) Int. Cl.
| | |
|---|---|
| *C08K 3/32* | (2006.01) |
| *C01B 25/163* | (2006.01) |
| *C01B 25/168* | (2006.01) |
| *C08K 3/40* | (2006.01) |
| *C08L 77/06* | (2006.01) |
| *C09K 21/04* | (2006.01) |
| *C01B 25/42* | (2006.01) |

(52) U.S. Cl.
CPC .............. *C08K 3/32* (2013.01); *C01B 25/163* (2013.01); *C01B 25/168* (2013.01); *C01B 25/42* (2013.01); *C01B 25/425* (2013.01); *C08K 3/40* (2013.01); *C08L 77/06* (2013.01); *C09K 21/04* (2013.01); *C08L 2201/02* (2013.01)

(58) Field of Classification Search
CPC .......... C08K 3/32; C08K 3/40; C01B 25/163; C01B 25/168; C01B 25/36; C01B 25/42; C01B 25/425; C08L 77/06; C09K 21/04
USPC .................................. 524/100, 414; 423/305
See application file for complete search history.

(56) References Cited

U.S. PATENT DOCUMENTS

| | | | |
|---|---|---|---|
| 3,894,986 A | 7/1975 | Werner et al. | |
| 4,267,098 A | 5/1981 | Hartwimmer et al. | |
| 4,859,366 A | 8/1989 | Djiauw et al. | |
| 4,859,466 A | 8/1989 | Maier | |
| 4,879,327 A | 11/1989 | Poisson et al. | |
| 4,972,011 A | 11/1990 | Richardson et al. | |
| 6,255,371 B1 | 7/2001 | Schlosser et al. | |
| 6,365,071 B1 | 4/2002 | Jenewein et al. | |
| 6,547,992 B1 | 4/2003 | Schlosser et al. | |
| 2006/0138391 A1* | 6/2006 | Drewes | C08K 5/34928 252/601 |
| 2007/0029532 A1 | 2/2007 | Hansel et al. | |
| 2013/0190432 A1 | 7/2013 | Krause et al. | |
| 2013/0251773 A1* | 9/2013 | Galiatsatos | A01N 25/18 424/403 |

FOREIGN PATENT DOCUMENTS

| | | |
|---|---|---|
| DE | 3833977 | 4/1990 |
| WO | 2012045414 | 4/2012 |

OTHER PUBLICATIONS

International Preliminary Report on Patentability mailed in PCT/US2015/029172 dated Jan. 31, 2017.

* cited by examiner

*Primary Examiner* — Josephine L Chang
(74) *Attorney, Agent, or Firm* — Dilworth IP, LLC

(57) ABSTRACT

Flame retardant polymer compositions comprising certain thermally stable salts of pyrophosphonic acid as flame retardant materials, which flame retardant materials comprise one or more than one metals, are prepared and have excellent flame retardant activity.

16 Claims, No Drawings

SALTS OF PYROPHOSPHONIC ACID AS FLAME RETARDANTS

This application claims benefit under 35 USC 119(e) of U.S. Provisional Application No. 62/030,125 filed Jul. 29, 2014, and 62/115,000 filed Feb. 11, 2015, the disclosures of which are incorporated herein by reference.

Certain salts of pyrophosphonic acid are shown to be thermally stable, highly efficient flame retardant materials well suited for use as flame retardant additives in polymers. The flame retardants of the invention can also be used in combination with other flame retardants, synergists or adjuvants.

BACKGROUND OF THE INVENTION

Polymers, such as polyolefins, polyesters, polycarbonates, polyamides, polyurethanes, epoxy resins, and other thermoplastic or thermoset polymer resins, are frequently made more flame retardant by incorporating therein a phosphorus-containing compound, a halogen-containing compound or a mixture thereof.

Some polymers are processed at high temperatures, for example 200° C., 220° C., 250° C. or higher, and many known flame retardants are not suitable under these conditions because they are too volatile, not sufficiently thermally stable, have an adverse effect on processing, etc. Certain organophosphorus flame retardant compounds, such as some phosphate esters, can also exhibit a plasticizing effect which may adversely affect mechanical properties of the polymers into which they are added. In addition, compounds such as some phosphates are relatively unstable to hydrolysis, which can result in undesired formation of various phosphoric acid compounds.

Salts of phosphorus containing acids are known flame-retardant additives, in particular for thermoplastic polymers. U.S. Pat. No. 3,894,986 discloses flame retardant thermoplastic polyesters containing alkali salts of phosphonic acids, e.g., the mono sodium salt of ethane-phosphonic acid or a sodium salt of a mono-methyl ester of an alkane-phosphonic acid. U.S. Pat. No. 4,972,011 discloses aluminum salts of alkylphosphonic acids or mono-alkyl esters of alkane-phosphonic acids, i.e., salts of compounds of formula (III), wherein R is for example methyl, ethyl, propyl or isopropyl etc., unsubstituted or substituted by one or more halo or hydroxy groups; and R' is hydrogen, methyl, ethyl, propyl, or isopropyl

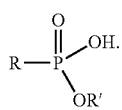

(III)

DE 3833977 discloses metal salts of compounds of formula (III) prepared from reactions of dimethyl methylphosphinate and metal oxides or hydroxides in water at high pressures and temperatures from 120 to 200° C.; reactions run in aqueous solution under elevated pressures at temperatures up to 190° C. in an autoclave are exemplified. Adducts of these salts with amines such as ethylene diamine and melamine, and use of the adducts as flame retardants in thermoplastics are also disclosed.

Salts of phosphinic acids, i.e., compounds of formula (II) wherein $R_1$ and $R_2$ are alkyl or carbon based aromatic, are also known flame-retardant additives for thermoplastic polymers.

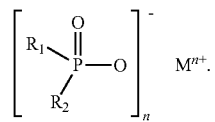

(II)

Salts wherein M is selected from Mg, Ca, Al, Sb, Sn, Ge, Ti, Zn, Fe, Zr, Ce, Bi, Li, Na, K or protonated nitrogen base are known. For example, U.S. Pat. Nos. 5,780,534 and 6,013,707 disclose that calcium phosphinates and aluminum phosphinates of Formula (II) are particularly effective in polyester, for example, calcium and aluminum salts of dimethylphosphinic acid, ethylmethylphosphinic acid, diethylphosphinic acid, n-propylmethylphosphinic acid, n-propylethylphosphinic acid, di-n-propylphosphinic acid, diisopropylphosphinic acid or diphenylphosphinic acid.

U.S. Pat. No. 6,365,071 discloses a synergistic flame retardant combination for thermoplastic polymers, e.g., engineering plastics, especially for polyesters, comprising A) a phosphinic salt of the formula (II) above, e.g., aluminum dimethylphosphinate, aluminum methylethylphosphinate, and aluminum methylpropylphosphinate and B) a nitrogen compound such as allantoin, i.e., (2,5-dioxo-4-imidazolidinyl) urea, benzoguanamine, glycoluril, i.e., tetrahydroimidazo[4,5-d]imidazole-2,5-dione, urea cyanurate, melamine cyanurate and melamine phosphate. U.S. Pat. No. 6,255,371 discloses a flame retardant combination comprising, A) a phosphinate of formula (II) above, e.g., a diethyl phosphinate where M is calcium, magnesium, aluminum and/or zinc, and B) condensation or reaction products of melamine e.g., melamine polyphosphate, melam polyphosphate and melem polyphosphate.

U.S. Pat. No. 6,547,992 discloses a flame retardant combination for thermoplastic polymers comprising phosphinates and small amounts of inorganic and/or mineral compounds which do not contain nitrogen. WO 2012/045414 discloses a flame retardant composition comprising A) a phosphinic salt of the formula (II) above wherein M is selected from Mg, Ca, Al, Sb, Sn, Ge, Ti, Zn, Fe, Zr, Ce, Bi, Li, Na, K or a protonated nitrogen base; B) a metal salt of phosphonic acid; and other optional components.

The phosphinates cited above, e.g., U.S. Pat. Nos. 6,365, 071 and 6,255,371, are said to be thermally stable, and to not adversely affect polymers during processing. The phosphinates are not volatile under the customary conditions of preparation and processing of thermoplastic polymers. However, these materials are not necessarily suitable for use in all polymer systems and may create problems for processing or may lack the flame retardant effectiveness needed for certain polymers. There is still a need for flame retardants with greater efficiency at lower additive concentrations and improved processability for use in preparing flame retardant polymer compositions with highly desirable physical properties.

Phosphonic acid salts, i.e., salts metal salts of compounds according to formula (Ia), are also reported to be thermally stable, but this is of course a relative term. As disclosed in US 2007/0029532, decomposition of such phosphonic acid salts is well known at temperatures encountered during processing of polyesters and polyamides, damaging the polymers in the process.

Copending U.S. patent application Ser. Nos. 14/337,500 and 14/592,472, disclose that heating alkylphosphonic acid metal salts the formula:

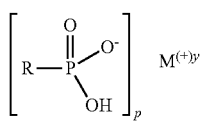

wherein R is alkyl, aryl and the like, e.g., aluminum salts, calcium salts, zinc salts etc., of methyl, ethyl, propyl, phenyl or benzyl phosphonic acid at temperatures in excess of 200° C. produces flame retardant materials that, unlike their precursors, are thermally stable at temperatures above 400° C. and can be thermally incorporated onto thermoplastic polymer resins without adversely impacting the physical properties of the polymer.

U.S. Pat. No. 4,879,327 discloses amine salts of phosphonic acid, i.e., s-triazine, 1,2,4-triazole, benzimidazole, heptazine, pyrimidine, or piperazine salts, which may be combined with a polyhydroxylated compound as fireproofing agents for plastics, e.g., polyamides and polyolefins.

Metal and ammonium salts of pyrophosphonic acid are known. U.S. Pat. No. 4,859,466 discloses that pyrophosphonic salts of formula (V) have microbiocide activity.

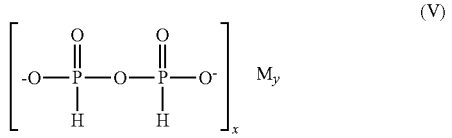

U.S. Pat. No. 4,267,098 discloses copolymers of ethylene and tetrafluoroethylene with improved heat stability comprising 0.001 to 2 wt % by weight of a metal salt of phosphonic acid, $H_2(HPO_3)$, diphosphonic acid, $H_2(H_2P_2O_5)$, hypodiphosphonic acid $H_2(H_2P_2O_4)$, or hypophosphonic acid $H(H_2PO_2)$, wherein the metal is selected from the first to third main group of the periodic table of the elements, e.g., zinc or manganese.

SUMMARY OF THE INVENTION

The present invention provides a flame retardant polymer composition comprising from 3% to 50%, by weight based on the total weight of the polymer composition, of a flame retardant comprising one or more compounds of general formula I,

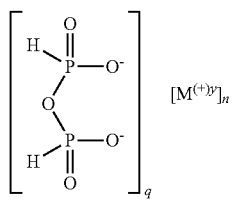

wherein y is a number of from 1 to 7, e.g., from 1 to 4, M is a metal-based cation or ammonium-based cation with a formal charge of (+)y, and q and n are values that satisfy the charge balance of the complex. For example, when y is 3, such as when M is Al, the flame retardant of the invention will have an empirical formula according to formula (I) wherein q is 3 and n is 2, and when y is 2, such as when M is Ca or Zn, the flame retardant of the invention will be a compound of formula (I) wherein q equals n, etc.

The flame retardants of the invention are thermally stable, e.g., stable at temperatures of 300° C. and higher and are often stable at temperature above 400° C. are readily incorporated into polymer resins such as polyesters, amides, epoxy resins, polyolefins, urethanes etc., and are particularly well suited for resins processes at high temperatures such as polyalkylene phthalates, polyamides etc.

In some embodiments, the polymer composition of the invention comprises a mixture of two or more compounds of formula (I), e.g., a combination of two or more compounds of general formula (I) wherein each contain different metals as M. In some embodiments, the polymer composition of the invention comprises one or more compounds of general formula (I) in which compound more than one metal is present, i.e., a compound of general formula (I) comprising a combination of more than one metal species as the value for $[M^{(+)y}]$.

In many embodiments the flame retardant polymer composition of the invention will also comprise additional flame retardant materials including synergists and adjuvants.

Other embodiments provide methods for preparing the flame retardants of the invention, methods for preparing and otherwise processing the flame retardant/polymer composition, and articles produced therefrom.

DESCRIPTION OF THE INVENTION

The invention provides a flame retardant polymer composition comprising:
a) a thermoset or thermoplastic polymer, and
b) from 3% to 50% by weight, based on the total weight of the composition, of a flame retardant comprising one or more compounds of general formula (I)

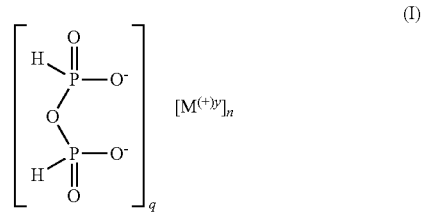

wherein y is a number of from 1 to 7, e.g., from 1 to 4, e.g., 1, 2, 3 or 4, M is a metal or ammonium-based cation with a formal charge of (+)y, and q and n are values that satisfy the charge balance of the complex.

In the most general embodiments of the invention M of formula (I) may be almost any metal or ammonium cation and one or more than one metal or ammonium ion can be present.

One or more than one flame retardant of formula I may be used in the present polymer compositions, for example, two or more different flame retardants of formula I, comprising a different metal as M, may be mixed together to form a blended flame retardant composition, or two or more flame retardants of formula I may be individually added to the polymer composition.

M as ammonium can be almost any nitrogen based cation, for example, $(R)_a(H)_bN^+$, wherein each R is independently selected and is alkyl, substituted alkyl, aryl, substituted aryl, a is a number from 0 to 4, b is a number from 0 to 4 and a+b=4; or two R groups can form a heterocyclic ring, with the remaining two R groups as defined above, e.g. two R groups and the nitrogen can form a pyridine, piperidine, pyrrole, pyrrolidine, etc.

Often, M is a metal-based cation comprising one or more than one metal selected from the group consisting of Li, K, Na, Mg, Ca, Ba, Zn, Zr, Ge, B, Al, Si, Ti, Cu, Fe, Sn and Sb, for example, Li, K, Na, Mg, Ca, Ba, Zn, Zr, B, Al, Si, Ti, Sn and Sb, in many embodiments Li, K, Na, Mg, Ca, Ba, Zn, Zr, B, Al, Sn and Sb, or Li, K, Na, Mg, Ca, Ba, Zn, B and Al. In particular embodiments, M is Al, Zn or Ca, or when more than one metal is present, at least one, or each, metal of M is selected from Al, Zn and Ca.

The flame retardant of the invention may be prepared by methods known in the art, e.g., heating salts of formula (IV) at temperatures of 200° C. or higher:

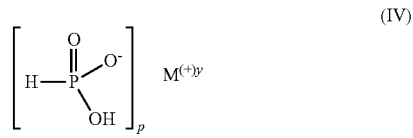

wherein M and y are as defined above and p is a number that provides a charge-balance salt. Temperatures higher than 200° C. are often employed in the process, e.g., 220° C. or higher or 240° C. or higher, and the amount of time the salt is heated may depend in part on the temperature employed.

Often, a single compound of formula (IV) is heated to produce the flame retardant of the invention. In many embodiments a mixture of compounds are produced, even when starting with a single compound of formula (IV), and may include, e.g., complex or polymeric salts, etc. Also, in many embodiments there is no attempt to isolate single components from such a mixture and the product mixture is used as formed, or subjected to minimal post reaction processing, i.e., isolation and purification. The exact composition of the flame retardant is generally determined by the process for producing it and general formula (I) can be seen as idealized empirical formula representing the major products produced.

In other embodiments, the flame retardant of the composition is prepared by heating a starting material comprising more than one compound of formula (IV). For example, two or more compounds of formula (IV) each having a different metal can be mixed together and this mixture can then be heated to form a mixed metal flame retardant of the invention. In one particular method, a phosphonic acid salt composition comprising more than one metal is prepared by combining phosphonic acid with more than one metal compound, often resulting in a mixture of single metal salts, mixed metal salts and possible metal complexes, which is then heated to form a mixed metal flame retardant of the invention. Such mixed metal flame retardants will typically be a mixture of compounds comprising one or more compounds of formula (I) wherein the metal component M in formula (I) represents a combination of more than one metal species, e.g.,

wherein each of y', y''', y''' etc. is a number of from 1 to 7, e.g., from 1 to 4, e.g., 1, 2, 3 or 4; each of $M_1$, $M_2$, $M_3$ etc. is a metal or ammonium-based cation with a formal charge of $(+)y'$, $(+)y''$, $(+)y'''$, etc., $n_1$, $n_2$, $n_3$, etc., represents the fractional component of each metal present so that q and $\Sigma(n_1, n_2, n_3 \ldots)$ are values that satisfy the charge balance of the complex. In theory, any number of metal species may be present, but in many embodiments two or three metals are used in forming mixed metal flame retardants, typically two.

Flame retardants of the invention comprising a mixture of metals can be formed in various ways, and the exact composition of the mixed metal flame retardant will be determined by the method by which it is prepared.

For example, in one method, which can be called the intermediate salt complex method, phosphonic acid is treated with two or more appropriate metal compounds to give an intermediate salt complex comprising multiple metal species. Often at least one of the metals used in forming the intermediate salt complex will be a bidentate or polydentate metal and more than one intermediate complex may be formed. This salt complex is typically formed in a solvent, such as water or an organic solvent, e.g., water or a mixture comprising water, from which the intermediate salt complex is isolated by standard means before being heated as described above to obtain a mixed metal pyrophosphonic acid salt flame retardant.

Alternatively, in another method, which can be called the intimate salt mixture method, two or more metal phosphonic acid salts of formula (IV) are brought together to form an intimate salt mixture comprising salts or complexes having more than one metal component. This mixture is then subjected to heat treatment described above to obtain a mixed metal pyrophosphonic acid salt flame retardant. As with the intermediate complex method above, the intimate salt mixture is typically prepared using an organic or aqueous solvent, generally water or a mixture of water with an organic solvent, from which the intimate salt mixture is isolated by standard methods, such as distillation of the solvent, before heating to form the flame retardant of the invention. Other methods of isolation such as concentrating the solution and filtering suspended salts, trituration of salts or physically mixing isolated salts can be employed, but greater consistency is to be expected by removing the solvent via distillation.

One skilled in the art will readily appreciate that the exact composition the intermediates, and thus the final flame retardant products, obtained by the intermediate salt complex method and the intimate salt mixture method will generally differ, even when using the same mixture of metals, especially when one or more bidentate or polydentate metal is used. Further, either of these two methods is likely to produce products not readily obtained by blending separately prepared flame retardants of formula (I) from different single metal salts of formula (IV). Thus, differences in physical characteristics, stability, miscibility and performance for the mixed metal products of the different methods are generally encountered.

The thermoset or thermoplastic polymer of the invention may be any polymer known in the art, such as polyolefin photopolymers and copolymers, rubbers, polyesters, epoxy resins, polyurethanes, polyalkylene terephthalates, polysulfones, polyimides, polyphenylene ethers, styrenic polymers and copolymers, polycarbonates, acrylic polymers, polyamides, polyacetals, epoxy resins and biodegradable polymers. Mixtures of different polymers, such as polyphenylene ether/styrenic resin blends, polyvinyl chloride/ABS or other impact modified polymers, such as methacrylonitrile and α-methylstyrene containing ABS, and polyester/ABS or polycarbonate/ABS and polyester plus some other impact modifier may also be used. Such polymers are available commercially or made by means well known in the art.

More than one polymer resin may be present

The flame retardant of the invention is particularly useful in thermoplastic polymers that are processed and/or used at high temperatures, for example, styrenic polymers including HIPS, polyolefins, polyesters, polycarbonates, polyamides, polyurethanes, polyphenylene ethers and the like.

For example, the polymer may be a polyester-series resin, a styrenic resin, a polyamide-series resin, a polycarbonate-series resin, a polyphenylene oxide-series resin, a vinyl-series resin, an olefinic resin, an acrylic resin, epoxy resin, or a polyurethane.

In many embodiments the polymer comprises a reinforcing agent, for example, the polymer may be a glass reinforced resin such as a glass reinforced thermoset resin, e.g., a glass reinforced epoxy resin, or the polymer may be a glass reinforced thermoplastic such as a glass reinforced polyamide or polyester, e.g., a glass filled polyalkylene terephthalate or a glass filled polyamide.

Polyester-series resins include homopolyesters and copolyesters obtained by, for example, polycondensation of a dicarboxylic acid component and a diol component, and polycondensation of a hydroxycarboxylic acid or a lactone component, for example, aromatic saturated polyester-series resin, such as polybutylene terephthalate or polyethylene terephthalate.

Polyamide-series resins include polyamides derived from a diamine and a dicarboxylic acid; polyamides obtained from an aminocarboxylic acid, if necessary in combination with a diamine and/or a dicarboxylic acid; and polyamides derived from a lactam, if necessary in combination with a diamine and/or a dicarboxylic acid. The polyamide also includes a copolyamide derived from at least two different kinds of polyamide constituent components. Examples of polyamide-series resins include aliphatic polyamides such as nylon 46, nylon 6, nylon 66, nylon 610, nylon 612, nylon 11 and nylon 12, polyamides obtained from an aromatic dicarboxylic acid, e.g., terephthalic acid and/or isophthalic acid, and an aliphatic diamine, e.g., hexamethylenediamine or nonamethylenediamine, and polyamides obtained from both aromatic and aliphatic dicarboxylic acids, e.g., both terephthalic acid and adipic acid, and an aliphatic diamine, e.g., hexamethylenediamine, and others. These polyamides may be used singly or in combination.

Polyamides with melting points of at least 280° C. are used extensively for producing molding compositions which make possible the production of molded articles, e.g. for the electrical and electronics industry, with excellent dimensional stability at high temperatures and with very good flame-retardant properties. Molding compositions of this type are demanded for example in the electronics industry for producing components which are mounted on printed circuit boards according to the so-called surface mounting technology, SMT. In this application, these components must withstand temperatures of up to 270° C. for short periods of time without dimensional change.

Certain particular embodiments of the invention are thus to compositions comprising high temperature polyamides, i.e., a polyamide that melts at high temperatures, e.g., 280° C. or higher, such as polyamide 4,6, which has a higher melting range than most aliphatic polyamides, and many aromatic and semi-aromatic polyamide resins, such as polyamide 4T; polyamide MXD,6; polyamide 12,T; polyamide 10,T; polyamide 9,T; polyamide 6,T/6,6; polyamide 6,T/D,T; polyamide 6,6/6,T/6,1; polyamide 6/6,T and the like; articles comprising high temperature polyamides and the flame retardant material of the invention, methods for preparing the compositions and methods for shaping the articles.

The flame retardant (b) exhibits excellent activity in polymer systems. In many embodiments the flame retardant of the invention is used in combination with other flame retardants, synergists or adjuvants. The concentration of the inventive flame retardant in the polymer composition is of course dependent on the exact chemical composition of the flame retardant, the polymer and other components found in the final polymer composition. For example, the inventive flame retardant may be present in a concentration of from about 3 to about 50%, e.g., 3 to 30%, 5 to 50%, or 5 to 30%, by weight of the total weight of the final composition. Often, there will be at least 4% of the inventive flame retardant present, for example 5% or more, 7% or more, 10% or more, 15% or more, 20% or more or 25% or more. In many embodiments, the inventive flame retardant is present in amounts up to 45%, while in other embodiments, the amount of inventive flame retardant is 40% of the polymer composition or less, e.g., 35% or less. Obviously, when used in combination with other flame retardants or flame retardant synergists, less of the pyrophosphonic acid salt of the invention should be needed.

Any known compounding techniques may be used to prepare the flame retardant polymer composition of the invention, for example, the flame retardant may be introduced into molten polymer by blending, extrusion, fiber or film formation etc. The flame retardant may be introduced as part of a masterbatch. In some cases the flame retardant is introduced into the polymer at the time of polymer formation or curing, for example, the flame retardant of the invention may be added to a polyurethane prepolymer prior to crosslinking or it may be added to a polyamine or alkyl-polycarboxyl compound prior to polyamide formation or to an epoxy mixture prior to cure.

The flame retardant of the invention may be used with a variety of other flame retardants, synergists or flame retardant adjuvants as known in the art. For example, the flame retardant of the invention may be formulated with other flame retardants such as the flame retardants produced in copending U.S. application Ser. Nos. 14/337,500 and 14/592,472, halogenated flame retardants, alkyl or aryl phosphine oxide flame retardants, alkyl or aryl phosphate flame retardants, alkyl or aryl phosphonates, alkyl or aryl phosphinates, and salts of alkyl or aryl phosphinic acid. One particular embodiment provides a synergistic mixture of the flame retardant of the invention and a phosphinic salt of formula (II), e.g., an aluminum tris(dialkylphosphinate).

The flame retardant may also be formulated with synergists or flame retardant adjuvants, for example, the flame retardant of the invention may be formulated with one or more materials selected from:

carbon black, graphite, carbon nanotubes, silicones; polyphenylene ether (PPE), phosphine oxides and polyphosphine oxides, e.g., benzylic phosphine oxides, poly benzylic phosphine oxides and the like;

melamine, melamine derivatives and condensation products, melamine salts such as, but not limited to, melamine cyanurate, melamine borate, melamine phosphates, melamine metal phosphates, and the like;

inorganic compounds including clays, metal salts such as hydroxides, oxides, oxide hydrates, borates, carbonates, sulfates, phosphates, phosphonatess, phosphinates, silicates, mixed metal salts, etc., e.g., talc and other magnesium silicates, calcium silicate, aluminosilicate, aluminosilicate as hollow tubes (DRAGONITE), calcium carbonate, magnesium carbonate, barium sulfate, calcium sulfate, HALLOYSITE or boron phosphate, calcium molybdate, exfoliated vermiculite, zinc stannate, zinc hydroxystannate, zinc sulfide and zinc borate, zinc molybdate (KEMGARD 911A/B), zinc phosphate (KEMGARD 981), magnesium oxide or hydroxide, aluminum oxide, aluminum oxide hydroxide (Boehmite), aluminum trihydrate, silica, tin oxide, antimony oxide (III and V) and oxide hydrate, titanium oxide, and zinc oxide or oxide hydrate, zirconium oxide and/or zirconium hydroxide and the like.

Unless otherwise specified, in the context of the present application, the term "phosphate" when used as a component in a "phosphate salt", such as in metal phosphate, melamine phosphate, melamine metal phosphate, etc., refers to a phosphate, hydrogen phosphate, dihydrogen phosphate, pyrophosphate, polyphosphate, or a phosphoric acid condensation products anion or polyanion. Likewise, unless otherwise specified, in the context of the present application, the term "phosphonate" when used as a component in a "phosphonate salt", such as in metal phosphonate, etc., refers to a phosphonate or hydrogen phosphonate.

Thus, in many embodiments the flame retardant polymer composition according to the invention comprise the polymer (a), the flame retardant (b), and further comprise (c) one or more additional flame retardants, and/or one or more synergists or flame retardant adjuvants.

For example, in some embodiments the flame retardant polymer composition comprises one or more additional flame retardants, e.g., halogenated flame retardants, phosphine oxide flame retardants, alkyl or aryl phosphonates, or salts of alkyl or aryl phosphinates, e.g., an aluminum tris(dialkylphosphinate) such as aluminum tris(diethylphosphinate);
and/or
one or more synergists or flame retardant adjuvants, e.g., melamine, melamine derivatives and condensation products, melamine salts, phosphine oxides and polyphosphine oxides, metal salts such as hydroxides, oxides, oxide hydrates, borates, phosphates, phosphonates, silicates and the like, e.g. aluminum hydrogen phosphonate, melam, melem or a melamine metal phosphate, e.g., a melamine metal phosphate wherein the metal comprises aluminum, magnesium or zinc. In particular embodiments the one or more additional flame retardant, synergist or flame retardant adjuvant comprises an aluminum tris(dialkylphosphinate), aluminum hydrogen phosphonate, methylene-diphenylphosphine oxide-substituted polyaryl ether, xylylenebis(diphenylphosphine oxide), 4,4'-bis(diphenylphosphinylmethyl)-1, 1'-biphenyl, ethylene bis-1,2-bis-(9,10-dihydro-9-oxy-10-phosphaphenanthrene-10-oxide)ethane, melem, or dimelamine zinc pyrophosphate.

One particular embodiment is to a synergistic mixture comprising the flame retardant of the invention and aluminum tris(diethylphosphinate).

For example, the flame retardant of the invention may be combined with an additional flame retardant, synergist or adjuvant in a range of 100:1 to 1:100 by weight of inventive flame retardant to the total weight of additional flame retardant, synergist and adjuvant. Depending on the additional flame retardant, synergist or adjuvant, excellent can be obtained using a range of 10:1 to 1:10 by weight of flame retardant to additional flame retardant, synergist and/or adjuvant, for example, weight ratios ranging from 7:1 to 1:7, 6:1 to 1:6, 4:1 to 1:4, 3:1 to 1:3 and 2:1 to 1:2 are used to good benefit. The inventive flame retardant is typically the majority component in such a combination, e.g., a 10:1 to 1.2:1 ratio or a 7:1 to 2:1 ratio by weight of the inventive flame retardant material to additional flame retardant, synergist and/or adjuvant, but the inventive material can also be the minor component of the mixture, e.g., a 1:10 to 1:1.2 ratio or a 1:7 to 1:2 ratio of flame retardant to additional flame retardant, synergist and/or adjuvant synergist.

The flame retardant polymer composition of the invention will also typically contain one or more of the common stabilizers or other additives frequently encountered in the art such as phenolic antioxidants, hindered amine light stabilizers (HALS), the ultraviolet light absorbers, phosphonates, phosphonites, alkaline metal salts of fatty acids, hydrotalcites, metal oxides, borates, epoxidized soybean oils, the hydroxylamines, the tertiary amine oxides, lactones, thermal reaction products of tertiary amine oxides, thiosynergists, basic co-stabilizers, for example, melamine, melem etc., polyvinylpyrrolidone, dicyandiamide, triallyl cyanurate, urea derivatives, hydrazine derivatives, amines, polyamides, polyurethanes, hydrotalcites, alkali metal salts and alkaline earth metal salts of higher fatty adds, for example, Ca stearate, calcium stearoyl lactate, calcium lactate, Zn stearate, Zn octoate, Mg stearate, Na ricinoleate and K palmirate, antimony pyrocatecholate or zinc pyrocatecholate, nucleating agents, clarifying agents, etc.

Other additives may also be present, for example, plasticizers, lubricants, emulsifiers, pigments, dyes, optical brighteners, other flameproofing agents, anti-static agents, blowing agents, anti-drip agents, e.g., PTFE, and the like.

Optionally the polymer may include fillers and reinforcing agents, for example, calcium carbonate, silicates, glass fibers, talc, kaolin, mica, barium sulfate, metal oxides and hydroxides, carbon black and graphite. Such fillers and reinforcing agents may often be present at relatively high concentrations, including formulations where the filler or reinforcement is present in concentrations of over 50 wt % based on the weight of the final composition. More typically, fillers and reinforcing agents are present from about 5 to about 50 wt %, e.g., about 10 to about 40 wt % or about 15 to about 30 wt % based on the weight of the total polymer composition.

EXAMPLES

Example 1

Preparation of Calcium Pyrophosphonate, FR-INV1

To a 4.0 M aqueous solution of 50.0 g phosphonic acid (610 mmol) was added 30.5 g calcium carbonate (305 mmol) in parts. The solution was subsequently concentrated to dryness under reduced pressure. Heating this material at 160° C. for 20 h in a vacuum oven followed by thermal treatment for 4 h at 280° C. afforded a white solid that is thermally stable to around 500° C. Elemental analysis: 30.5% P (Th. 33.7%), 20.3% Ca (Th. 21.8%).

Example 2

Preparation of Aluminum Dihydrogen Phosphonate

To a 2.5 M aqueous solution of 105.3 g phosphonic acid (1.28 mol) cooled to 15° C. under nitrogen was added 87.4 g aluminum isopropoxide (0.428 mol). After the initial exotherm, the pot temperature returned to 15° C. and cooling was removed. The reaction was allowed to warm to room temperature and stirred for 64 h. The solution was concentrated under reduced pressure and dried in a vacuum oven at 100° C. overnight to afford a glassy material that was crushed into a white powder.

Example 3

Preparation of Aluminum Pyrophosphonate, FR-INV2

75.5 g aluminum dihydrogen phosphonate (280 mmol) and 180 g diphenylmethane were heated with stirring under nitrogen to 185° C. over 1 h and held at 185° C. for an additional 10 h. The reaction mixture was then cooled to 75° C., filtered and washed with toluene. The filter cake was then slurried in toluene for 1 h and filtered again. Drying in a vacuum oven at 90° C. overnight afforded a white solid that is thermally stable to around 350° C. Elemental analysis: 35.4% P (Th. 38.3%), 11.0% Al (Th. 11.1%).

Example 4

Preparation of Calcium/Magnesium Pyrophosphonate Flame Retardant

Addition of a mixture of calcium hydroxide and magnesium hydroxide, roughly 2:1 molar ratio, to phosphonic acid as 4.0 M aqueous solution produces a solution of a mixed metal dihydrogen phosphonate salt complex, which can be concentrated to dryness under vacuum and heated as in Example 1 to provide the mixed metal flame retardant as a thermally stable solid.

Example 5

Preparation of Calcium/Aluminum Pyrophosphonate Flame Retardant

Combining a solution of aluminum dihydrogen phosphonate from Example 2 with a similar calcium dihydrogen phosphonate solution produces a solution of an intimate mixed metal dihydrogen phosphonate salt mixture, which can be concentrated to dryness under vacuum and heated as in Example 1 to provide the mixed metal flame retardant as a thermally stable solid.

Example 6

Preparation of Calcium/Sodium Pyrophosphonate Flame Retardant

Repeating the process of Example 4 but replacing magnesium hydroxide with an appropriate amount of sodium hydroxide produces the mixed metal flame retardant as a thermally stable solid.

FR Performance

Formulations comprising the flame retardants from Example 1, i.e., FR-INV1, and Example 3, i.e., FR-INV2, and various synergists were compounded into polyamide 66 with glass using a Haake Rheocord 90 and molded with a BabyPlast Mini-Molder into 1/16" bars which were subjected to standard UL 94 Vertical Burn Test. Formulations and results are listed in Table 1 below.

TABLE 1

Flammability Data for Inventive FR

| | \multicolumn{5}{c}{Formulation} | | | | |
|---|---|---|---|---|---|
| | A | B | C | D | E |
| Nylon 66 | 55.9 | 47.4 | 37.6 | 58.6 | 50.1 |
| Glass | 30 | 30 | 30 | 30 | 30 |
| FR-INV1 | 14.1 | 14.1 | 12.4 | | |
| FR-INV2 | | | | 11.4 | 11.4 |
| SYN1 | | 8.5 | | | 8.5 |
| SYN2 | | | 10 | | |
| SYN3 | | | 10 | | |
| UL 94 | NR | V-0 | V-0 | NR | V-0 |

Synergists Used in the FR Formulations:
SYN1: Aluminum Tris(Diethylphosphinate), Exolit® OP 1230

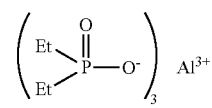

SYN2: Dimelamine Zinc Pyrophosphate, Safire® 400

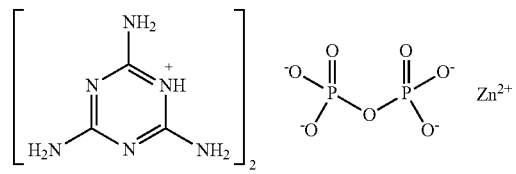

SYN3: Methylene-Diphenylphosphine Oxide-Substituted Polyaryl Ether

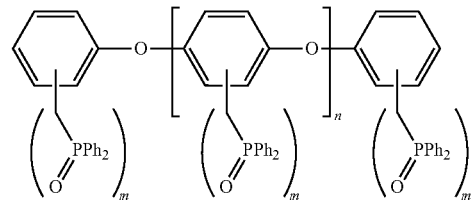

What is claimed:
1. A flame retardant polymer composition comprising:
a) a thermoset or thermoplastic polymer,
b) from 3% to 50% by weight, based on the total weight of the flame retardant polymer composition, of a flame retardant comprising one or more compounds of formula (I):

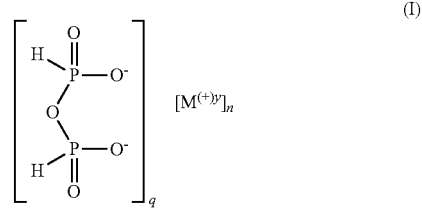

wherein y is 2, 3 or 4, M is a metal with a formal charge of (+)y, and q and n are values that satisfy the charge balance of the complex, wherein the thermoset or thermoplastic polymer comprises a reinforcing agent and one or more of a styrenic polymer, polyolefin, polyester, epoxy resin, polycarbonate, polyamide, or polyurethane.

2. The flame retardant polymer composition according to claim 1 wherein the flame retardant of b) comprises one or more mixed metal compounds of formula (I) wherein M is a metal-based cation wherein a combination of more than one metal species is present.

3. The flame retardant polymer composition according to claim 2 wherein M in formula (I) is a combination of more than one metal species selected from the group consisting of Mg, Ca, Ba, Zn, Zr, B, Al, Si, Ti, Sn and Sb.

4. The flame retardant polymer composition according to claim 2 wherein each metal is selected from the group consisting of Al, Zn or Ca.

5. The flame retardant polymer composition according to claim 2 wherein the flame retardant material b) is obtained by a process wherein, to phosphonic acid in a solvent is added two or more metal compounds to give an intermediate salt complex comprising more than one metal, isolating the intermediate salt complex and subsequently heating the isolated intermediate salt complex at temperatures of 200° C. or higher.

6. The flame retardant polymer composition according to claim 2 wherein the flame retardant material b) is obtained by a process consisting of mixing together two or more metal phosphonic acid salts in a solvent to form an intimate salt mixture comprising salts or complexes having more than one metal component, isolating the intimate salt mixture and subsequently heating the isolated intimate salt mixture at temperatures of 200° C. or higher.

7. The flame retardant polymer composition according to claim 1 wherein M in formula (I) consists of one metal selected from the group consisting of Mg, Ca, Ba, Zn, Zr, B, Al, Si, Ti, Sn and Sb.

8. The flame retardant polymer composition according to claim 1 wherein M comprises at least one metal selected from the group consisting of Al, Zn or Ca.

9. The flame retardant polymer composition according to claim 1 wherein the thermoset or thermoplastic polymer comprises one or more of a polyphenylene ether/styrenic resin blend, ABS, polyvinyl chloride/ABS blend, methacrylonitrile containing ABS, α-methylstyrene containing ABS, polyester/ABS, polycarbonate/ABS, impact modified polyester or impact modified polystyrene.

10. The flame retardant polymer composition according to claim 1 wherein the thermoset or thermoplastic polymer comprises a polyalkylene terephthalate, HIPS, epoxy resin or polyamide.

11. The flame retardant polymer composition according to claim 10 wherein the thermoset or thermoplastic polymer comprises polybutylene terephthalate, polyethylene terephthalate, glass filled polybutylene terephthalate, glass filled polyethylene terephthalate, a glass reinforced epoxy resin, a thermoplastic polyamide or a glass filled thermoplastic polyamide.

12. The flame retardant polymer composition according to claim 11, wherein the polyamide or glass filled polyamide comprises nylon 66.

13. The flame retardant polymer composition according to claim 1 further comprising (c) one or more additional flame retardants, and/or one or more synergists and/or flame retardant adjuvants.

14. The flame retardant polymer composition according to claim 13, wherein the one or more additional flame retardants comprise halogenated flame retardants, alkyl or aryl phosphine oxide flame retardants, alkyl or aryl phosphate flame retardants, alkyl or aryl phosphonates, alkyl or aryl alkylphosphinates, or salts of alkyl or aryl phosphinic acid, and the one or more synergists or flame retardant adjuvants comprise melamine, melamine derivatives, melamine condensation products, melamine salts, phosphine oxides, polyphosphine oxides, or metal hydroxides, oxides, oxide hydrates, borates, phosphates, phosphonates or silicates.

15. The flame retardant polymer composition according to claim 14, wherein the one or more additional flame retardant, synergist or flame retardant adjuvant comprises aluminum hydrogen phosphonate, benzylic phosphine oxides, poly benzylic phosphine oxides, melam, melem or melamine metal phosphate wherein the metal comprises aluminum, zinc or magnesium.

16. The flame retardant polymer composition according to claim 15, wherein the one or more additional flame retardant, synergist or flame retardant adjuvant comprises aluminum tris(diethylphosphinate), aluminum hydrogen phosphonate , methylene-diphenylphosphine oxide-substituted polyaryl ether, xylylenebis(diphenylphosphine oxide), 1,2-bis-(9,10-dihydro-9-oxy-10-phosphaphenanthrene-10-oxide)ethane, a 4,4'-bis(diphenylphosphinylmethyl)-1,1'-biphenyl, melem, or dimelamine zinc pyrophosphate.

* * * * *